March 2, 1926.
A. S. CROWLEY
1,574,869
HOLDING DEVICE
Filed June 29, 1923
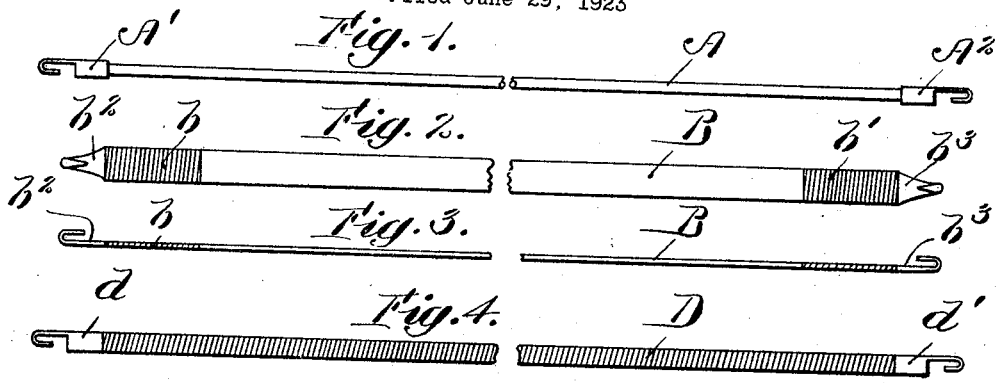
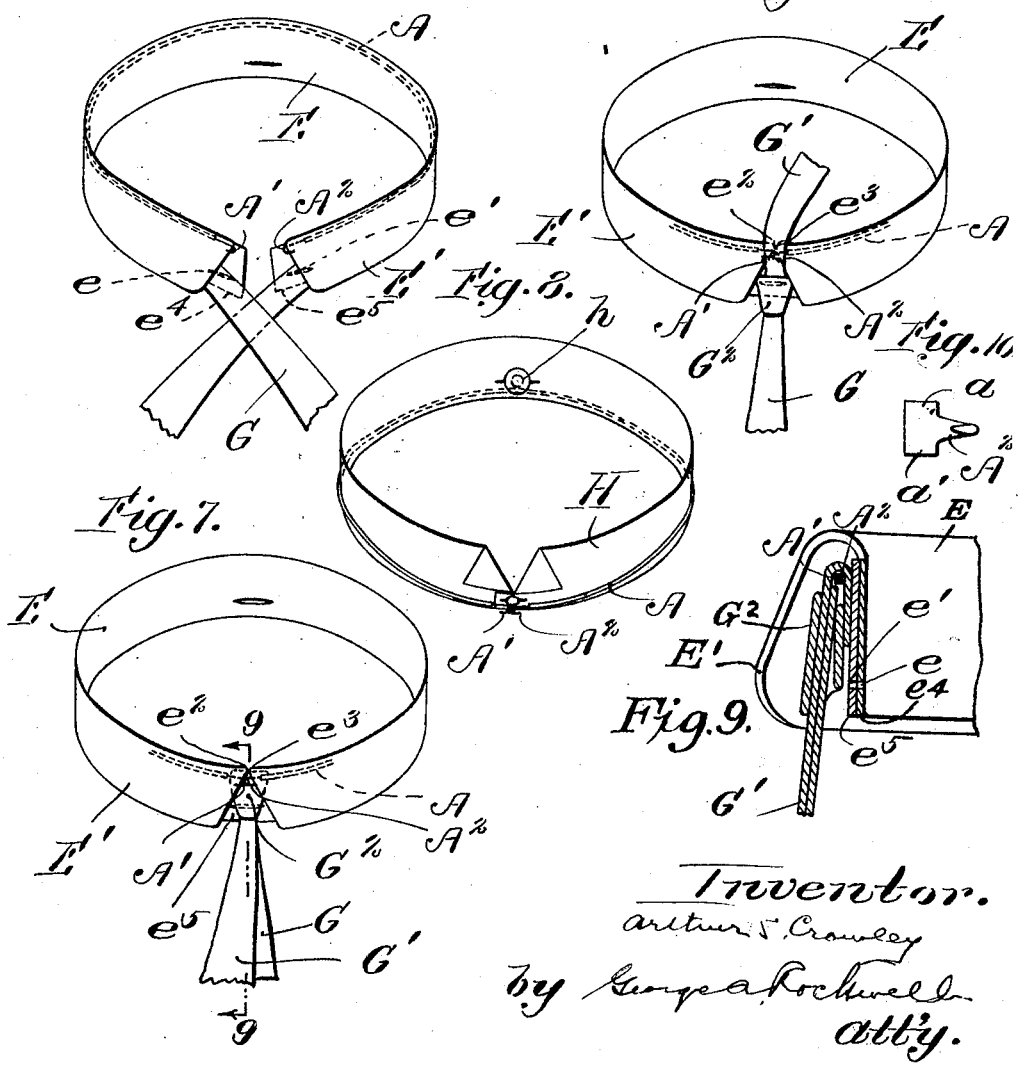
Inventor.
Arthur S. Crowley
by George A. Rockwell
Att'y.

Patented Mar. 2, 1926.

1,574,869

UNITED STATES PATENT OFFICE.

ARTHUR S. CROWLEY, OF CAMBRIDGE, MASSACHUSETTS.

HOLDING DEVICE.

Application filed June 29, 1923. Serial No. 648,563.

*To all whom it may concern:*

Be it known that I, ARTHUR S. CROWLEY, a citizen of the United States, and resident of Cambridge, in the county of Middlesex and State of Massachusetts, have invented a new and useful Holding Device, of which the following is a specification.

One object of my invention is to provide means for holding a tie in the desired position with relation to a collar so as to give a neat appearance.

Another object is to provide means for holding the front edges of a collar closely together at the top so as to preserve a neat appearance of the collar.

Other objects will be referred to below.

A feature of my invention is a holding member encircling the collar and combined with a tie, preferably a folded tie, to hold the latter in position with relation to the collar.

Another feature is an annular holding member encircling the collar and being in part, at least, resilient and having ends adapted to interlock so as to act to force closely together the tops of the front edges of a collar.

Another feature is the combination of a holding member having such resilient portion with a collar and with a tie, preferably a folded tie.

Other features will be pointed out below.

In the drawing—

Figure 1 is an elevation of the preferred form of holding member;

Figure 2 is an elevation, and Fig. 3 a plan, of a modification described below;

Figure 4 is an elevation of another form;

Figure 5 is a perspective view of the holding member and collar and tie prior to attachment to a shirt;

Figure 6 is a perspective view showing the collar and holding member in place and the tie partly folded;

Figure 7 is a perspective view showing all the elements in final position;

Figure 8 is a perspective view of a wing collar with the holding member in place;

Figure 9 is an enlarged sectional detail on the line 9—9 of Figure 7; and

Figure 10 is a detail of one of the hooks shown in Figure 1.

In Figure 1 I show a holding member comprising a body portion A consisting of round elastic cord and comprising hooks A' and $A^2$. Hook $A^2$ is shown in detail in Figure 10, its wings $a$ and $a'$ being bent around one end of the body A and clenched thereto. Hook A' is similarly secured to the other end of the body portion.

In Figures 2 and 3 the body portion is not entirely resilient but consists of flat metal strip B suitably secured at each end, as by solder, to springs $b$ and $b'$, spring $b$ being suitably connected, as by solder, to hook $b^2$, and spring $b'$ being suitably connected, as by solder, to hook $b^3$.

In Figure 4 the body D is entirely resilient and consists of a spiral spring suitably connected at its ends, as by solder, to hooks $d$ and $d'$.

I prefer to use the holding member of Figure 1 and I have therefore shown that form in Figures 5 to 9, Figure 5 showing said member in place between the fold E having flaps $e^4$ and $e^5$ and the fold E' of a turned down collar and surrounding the inner fold, the hooks being in engagement with the front edges of the outer fold as I find this a very convenient way of keeping the holding member in place with the hooks available for interlocking preparatory to attaching the collar to a shirt. The necktie G is also shown in place between the folds of the collar.

In Figure 6 the collar is in the position of attachment to a shirt (not shown), the button holes $e$ and $e'$ being in the position of attachment to the front collar button and the hooks A' and $A^2$ being interlocked with each other with the result that the upper corners $e^2$ and $e^3$ of the front edges of the outer fold are held firmly, snugly and neatly together as long as the collar is in use. The next step is to fold the tie G which is shown as a four-in-hand, the portion G' being passed behind the interlocked hooks and then upward temporarily as shown in Figure 6.

In Figure 7 the portion G' is shown as brought forward over the interlocked hooks and downward behind portion $G^2$ in the usual way and the tie is thus held permanently at the top of the opening between the folds to give a neat and dressy appearance. I have illustrated a four-in-hand tie but a bow or other folded tie can be used if desired.

In Figure 8 I show the holding member in place on a wing collar H, said member being held down at the back by collar button h, and having the hooks interlocked at the front and in position to have the tie folded about them as above explained in connection with Figures 6 and 7, which tie would conceal the holding member.

What I claim is:

The combination of a collar; an annular holding member having end portions interlocked to each other when said member is in use; and a tie having a portion encircling said interlocked ends to hold the tie in position with relation to the collar.

ARTHUR S. CROWLEY.